United States Patent [19]

Gutsche

[11] Patent Number: 5,764,021
[45] Date of Patent: Jun. 9, 1998

[54] METHOD AND DEVICE FOR SPEED CONTROL OF AN INDUCTION MOTOR

[75] Inventor: Gottfried Juergen Gutsche, Mississauga, Canada

[73] Assignee: Gottfried Gutsche, Canada

[21] Appl. No.: 784,898

[22] Filed: Jan. 16, 1997

[51] Int. Cl.[6] .................................................. H02P 1/26
[52] U.S. Cl. .......................... 318/727; 318/768; 318/772; 318/786; 318/805
[58] Field of Search .................. 318/700–839, 318/138, 139

[56] References Cited

U.S. PATENT DOCUMENTS

| | | | |
|---|---|---|---|
| 4,489,263 | 12/1984 | Potter et al. | 318/727 |
| 4,791,341 | 12/1988 | Brown et al. | 318/809 |
| 4,996,470 | 2/1991 | Rowan et al. | 318/772 |
| 5,187,419 | 2/1993 | DeLange | 318/805 |
| 5,510,687 | 4/1996 | Ursworth et al. | 318/727 |
| 5,670,858 | 9/1997 | Heath | 318/768 |

*Primary Examiner*—Paul Ip

[57] ABSTRACT

A method and device are disclosed for speed control of an AC induction motor by means of a control circuit which generate a motor drive voltage consisting of a combination of AC and time-spaced DC pulses. During the occurrence of the time-spaced DC pulses in the motor's AC drive voltage a back EMF suppression network is activated to absorb the motor's generated back EMF energy. A further feature of the invention is a slow down mode where the motor is decelerated from continuous full cycle AC to a requested slow speed setting by means of a higher contend of DC pulses in the AC drive voltage.

6 Claims, 1 Drawing Sheet

METHOD AND DEVICE FOR SPEED CONTROL OF AN INDUCTION MOTOR

FIELD OF THE INVENTION

The present invention relates to a method and device for very low RPM speed control of an induction motor, where the motor windings are supplied with a combination of alternate current and time-spaced DC pulses. Such a control method creates a rotating magnetic field interspersed with a short duration standing magnetic field. This type of motor control is useful in controlling AC induction motors in an automation equipment environment where accurate, slow speed positioning of automation elements is required.

DESCRIPTION OF THE PRIOR ART

Previous known induction motor speed control methods are accomplished by varying the supplied AC frequency, the AC supply voltage amplitude or varying both (see U.S. Pat. No. 4,131,937) and Japan Patent No. 60-223455). This has the effect of changing the speed of the rotating magnetic field and the rate of slip between rotor and rotating magnetic field. This control method is known as variable frequency variable voltage speed control and is used primarily for continuous variable speed control of induction motors.

The other known method to control an induction motor is by supplying a DC, pulsating DC, or phase controlled (phase shifted) rectified DC to the windings of the motor. Applying DC to the motor is known as direct current breaking (see U.S. Pat. Nos. 4,857,818 and 4,908,563). Direct current breaking creates a standing field which induces a strong eddy current in a rotating cage rotor and therefore creates a strong breaking force. Direct current breaking is used to slow the rotation of a motor in a rapid deceleration motion.

While prior art therefore uses either variable frequency or variable voltage or continuous pulsating DC to control the speed of an induction motor. The present invention uses AC in combination with time-spaced DC pulses to control the speed of the induction motor. Where the DC pulses are generated from rectified AC halve cycles and the resulting back EMF is feed back into the motor through a switchable back EMF suppression network. The rate of repetition of the DC pulses, contained in the AC supply voltage, determines the speed of the motor.

BRIEF SUMMARY OF THE INVENTION

It is the object of the present invention to provide a small size and low cost device for speed control of an induction motor.

It is another object of the invention to provide a speed control method for an induction motor capable of controlling the motor at very low RPM while maintaining sufficient torque characteristic.

It is still another object of the invention to provide a novel circuit to control both the speed of the induction motor and the braking mode using the same power circuit components.

It is yet another object of the invention to provide a speed control circuit combined with a rapid braking facility.

Other features and advantages of the invention will be apparent from the following description with the accompanying drawing.

DETAILED DESCRIPTION OF THE PREFERRED EMBODIMENT

Figure 1:
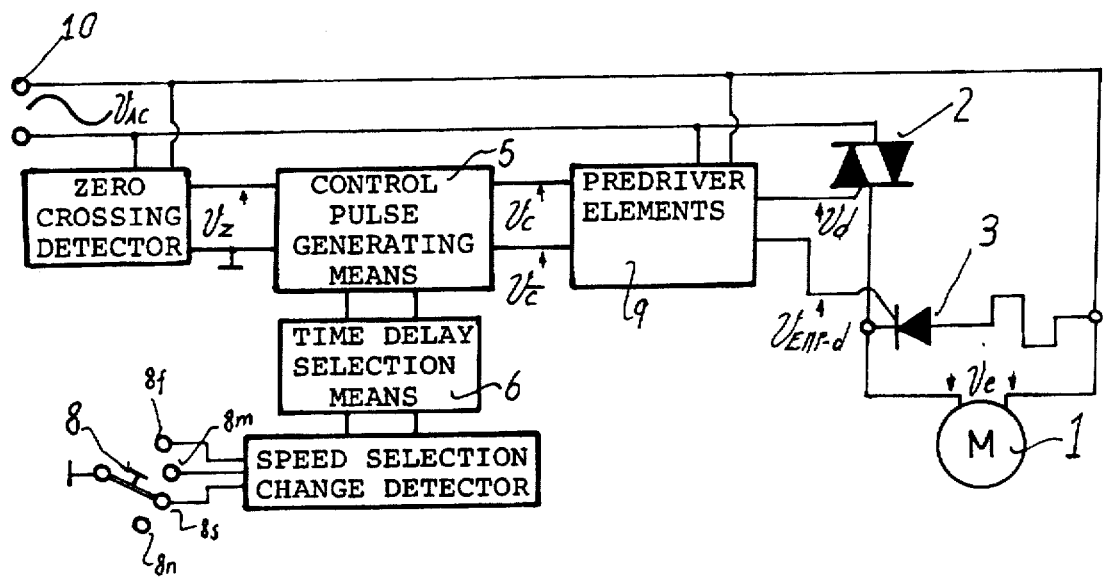
FIG. 1 is a circuit block diagram illustrating the operating principle to which the present invention can apply.
Figure 2:
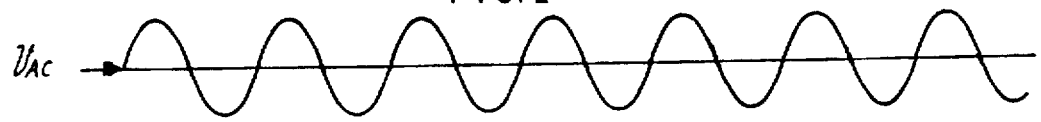
FIG. 2 is graph Vac illustrating the timing reference of all the timing graphs to the sinusoidal supply voltage.
Figure 3:
FIG. 3 is graph Vz illustrating the timing relationship of the positive zero crossing pulses.

Referring now to the drawings. FIG. 1 shows the novel speed control circuit, in block diagram form, as it may be used to control the induction motor 1. For energising the motor 1, the controllable power driver element 2 supplies voltage from the power input terminal 10 to the motor 1. For this purpose the controllable power driver element 2 is forming a series connection between terminal 10 and motor 1. For this invention the controllable power driver element 2 is not limited to one particular type of power driver device. While a triac type driver is depicted for the controllable power driver element 2, many different power driver technologies apply and in many cases depend on the type of induction motor used.

The controllable back EMF suppression element 3 is connected in parallel to the motor 1 to absorb the back EMF energy generated by the motor 1 during the course of the circuit's unique drive voltage. For this invention the controllable back EMF suppression element 3 is not limited to one particular type of power driver device. While a SCR type power driver in combination with a limiting resistor is depicted for the controllable back EMF suppression element 3, many different technologies apply and in many cases depend on the type of induction motor used. For multi phase motors, these two described circuits will be duplicated for every additional phase. The zero crossing detector 4 detects the exact beginning of the supply voltage AC cycle. The control pulse generating means 5 generates the main control pulse sequence. The time delay selection means 6 selects a time delay pulse duration from the control pulse generating means 5, according the speed demand setting means 8. During the time delay pulse duration AC-power is supplied to the motor 1. The time delay selection is varied to correspond to multiple AC-power halve cycle increments. The speed demand setting means 8 has a plural position selector. The position 8f is for full speed, 8m for medium speed, 8s for slow speed and 8n is for no speed respectively. More speed selection positions or a single analog selection position are of course possible. But for this invention the speed selection is not limited to one particular number of increments and would not change the essence of this circuit. A speed demand setting of full speed at position 8f will select no time delay with a solid active control pulse sequence. A setting at position 8n will select no time delay value with a solid inactive control pulse sequence. A setting at 8m or 8s will select a time delay value to accomplish a control pulse sequence for medium speed and slow speed respectively. The speed selection change detector 7 detects a change in speed demand, when changing from high speed to low speed.

The predriver elements 9 controls the controllable power driver elements 2 and 3 according to the control pulse sequence selected by the time delay selection means 6 The AC-power is supplied to the motor 1 via the controllable power driver element 2 according to the control pulse sequence.

Figure 4:
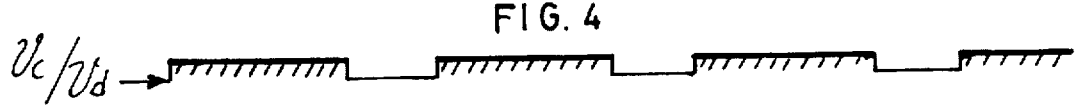
FIG. 4 is graph Vc-vd illustrating the control pulse sequence generated by the time delay generating means from the input of the speed input command setting means combined by the zero crossing pulses.

Referring now to FIG. 1 and graph Vc in FIG. 4. The circuit operation for the intermediate and low speed selection is now explained. As mentioned above, the full speed selection 8f, or no speed selection 8n, produces a solid active or inactive control pules sequence respectively. The zero crossing generator 4 is the trigger source for the time delay generating means 5 causing it to produce a control pulse sequence depicted in graph Vc as selected by the time delay selection means 6. The control pulse sequence reaches a positive state at a time-spaced rate of repetition in coincidence with multiple half cycles of the AC supply voltage. During the positive pulses in the control pulse sequence of graph Vc, represented by right shaded pulses, the controllable power driver element 2 becomes conductive for every half cycle of the AC supply voltage. But the controllable power driver element stays non-conductive during the negative portion of the pulse sequence Vc, causing suppression of only these selected AC supply voltage half cycles. During the suppression of the AC half cycles, because of the rectification effect, an effective DC pulse causes to occur in the AC supply voltage of the motor 1. The DC pulses in turn generate a back EMF in the motor 1.

Figure 5:
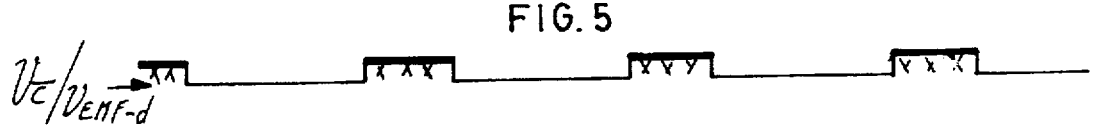
FIG. 5 is graph Vemf-d depicting the controllable power driver element driving signal for the controllable back EMF suppression element.
Figure 6:
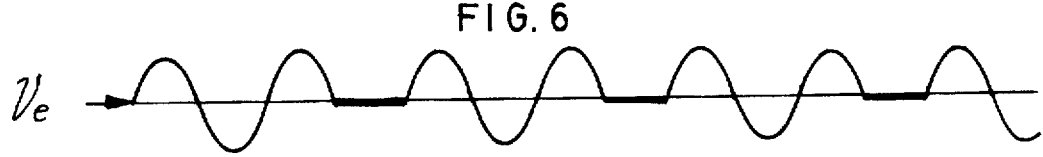
FIG. 6 is graph Ve illustrating the resultant motor drive voltage.

Referring now to FIG. 1 and graph Vemf-d in FIG. 5. During the positive pulses in the back EMF control pulse sequence represented in graph Vemf-d FIG. 5, indicated by cross shaded pulses, the controllable back EMF suppression element 3 is activated, which is at the coincidence of the non-conductive state of the controllable power driver element 2. The resultant voltage supplied to the motor 1 is depicted in graph Ve FIG. 6. Accordingly, the motor drive voltage is a time-spaced DC pulse modulated AC. The DC pulses contained in the AC drive voltage Ve generates a back EMF potential in the motor 1 which is being absorbed by the controllable back EMF suppression element 3. Absorbing the back EMF energy is causing the DC voltage pulses to produce a prolonged braking action in the motor 1. Therefore, the DC pulse modulated AC drive voltage depicted in graph Ve, together with the action of the controllable back EMF suppression element 3, results in a rotating magnetic field, interspersed with a short standing magnetic field in the motor 1. This combination of rotating and standing magnetic fields cause the motor 1 to rotate at the selected RPM speed without the usual loss in torque characteristic.

Referring to FIG. 1. A change from high speed to low speed by the speed demand selection means 8 causes a temporary decrease in time delay selection by the speed selection change detector 7. The shorter time delay causes a higher content of DC pules in the AC supply voltage to the motor 1 to occur, which allows the motor 1 to decelerate to the lower speed setting at a faster rate. This braking action is therefore accomplished with the addition of the speed selection change detector to the circuit.

It will be obvious to a person skilled in the art that the different embodiments of the invention are not restricted to the example described above, but that they may be varied within the scope of the following claims.

I claim:

1. An apparatus for speed control of an induction motor having a single phase AC-power source comprising:
   a controllable power driver element forming a series connection between the AC-power source and the motor;
   a zero crossing detector for detecting the beginning of the AC-power cycle;
   a speed demand setting means for input of a motor speed demand;
   a time delay selection means for selecting a time delay according the speed demand input setting;
   a control pulse sequence generating means for accepting trigger pulses from zero crossing detector and accepting time delay pulses from the time delay selection means, actively controlling the controllable power driver element in order to supply power to the motor in a pattern of repetitive duration of multiple AC halve cycles and remove power from the motor for one single AC halve cycle, thereby creating a combination of AC and time spaced DC pulses;
   the improvement comprising:
   a controllable back EMF suppression element connected in parallel with the motor forming an actively switchable back EMF suppression circuit loop, actively controlled by the control pulse sequence generating means, activated during the inactive one AC halve cycle time of the controllable power driver element, thereby feeding the generated EMF energy back into the motor.

2. The apparatus for speed control of an induction motor as claimed in claim 1 further comprising:
   a speed selection change detector actively connected between the speed demand selection means and the time delay selection means for detecting a change event in the speed input setting from high to low speed, causing a temporary period of shorter duration time delays to be selected to accomplish a temporary period of higher content of DC pulses in the motor drive voltage which in turn will break the motor speed to the new speed setting.
   a rotational speed measuring means attached to the motor output shaft for determining the actual motor rotational speed value and the output of the rotational speed measuring means coupled to the time delay selection means;
   a time delay selection means including a comparator means for determining the difference between the demand speed and the actual motor rotational speed value, the time delay selection means actively passing timing pulses to the control pulse sequence generating means to accomplish a zero difference between the speed demand setting and actual motor speed.

3. A method for speed control of an induction motor having a single phase AC-power source:
   a controllable power driver element forming a series connection between the AC-power source and the motor;
   a controllable back FMF suppression element connected in parallel with the motor forming an actively switchable EMF suppression circuit loop;
   a zero crossing detector for detecting the beginning of the AC-power cycle;
   a speed demand setting means for input of a motor speed demand;
   a time delay selection means for selecting a time delay according the speed demand input setting;
   a control pulse sequence generating means for controlling the power driver element;
   the method comprising the steps of:
   selecting a time delay duration from the control pulse generating means according the speed demand input setting; passing trigger pulses from the zero crossing detector to the control pulse generating means causing it to produce control pulses in synchronisation with the AC-power cycles;

activating the controllable power driver element for periods of multiple AC-power halve cycles, according the control pulse sequence, actively supplying power to the motor;

deactivating the controllable power driver element for one AC halve cycle with a repetition rate actively selected by the control pulse sequence, which results in a combination of alternating current and time spaced direct current pulses, causing the motor to respond with a duration of rotating magnetic fields interspersed with a short duration standing magnetic field;

the improved step comprising:

activating the controllable back EMF suppression element during the inactive AC halve cycle time of the controllable power driver element, thereby feeding the EMF back into the motor, inducing a strong eddy current in the motor rotor, causing the motor to respond with a higher intensity standing magnetic field.

4. The method for speed control of an induction motor as claimed in claim 3, further having:

a rotational speed measuring means attached to the motor output shaft and the output of the rotational speed measuring means coupled to the time delay selection means for determining the actual motor rotational speed value;

a time delay selection means including a comparator means for determining the difference between the demand speed and the actual motor rotational speed value;

the method comprising the steps of:

comparing the speed demand setting with the actual motor speed as indicated by the rotational speed measuring means to determine a possible speed differential value;

selecting an appropriate time delay value from the time delay selection means, governing the repetition rate of the time spaced DC pulses contained in the AC supply voltage, to accomplish a zero difference between the demand speed setting and actual motor speed.

5. An apparatus for speed control of an induction motor having a multi phase AC-power source comprising;

multiple controllable power driver element forming a series connection between the AC-power source and the motor;

multiple zero crossing detector for detecting the beginning of each phase AC-power cycle;

a speed demand setting means for input of a motor speed demand;

a time delay selection means for selecting a time delay according the speed demand input setting;

multiple control pulse sequence generating means for accepting trigger pulses from the zero crossing detectors and accepting time delay pulses from the time delay selection means, actively controlling the controllable power driver elements in order to supply power to the motor in a pattern of repetitive duration of multiple AC halve cycles and remove power from the motor for one single AC halve cycle, thereby creating a combination of AC and time spaced DC pulses;

the improvement comprising:

multiple controllable back EMF suppression elements connected in parallel with the motor forming actively switchable EMF suppression circuit loops, actively controlled by the control pulse sequence generating means, activated during the inactive one AC halve cycle time of the controllable power driver elements, thereby feeding the generated EMF energy back into the motor.

6. A method for speed control of an induction motor having multiple phase AC-power sources;

multiple controllable power driver elements forming a series connection between the multi phase AC-power source and the motor;

multiple controllable back EMF suppression elements connected in parallel with the motor forming actively switchable EMF suppression circuit loops;

multiple zero crossing detectors for detecting the beginning of the AC-power cycle in each phase;

a speed demand setting means for input of a motor speed demand;

a time delay selection means for selecting a time delay according the speed demand input setting;

multiple control pulse sequence generating means for controlling the multiple power driver elements;

the method comprising the steps of:

selecting a time delay duration from the control pulse generating means according the speed demand input setting;

passing trigger pulses from the zero crossing detectors to the control pulse generating means causing it to produce control pulses in synchronisation with the AC-power;

activating the controllable power driver elements for periods of multiple AC halve cycles according the control pulse sequence, actively supplying three phase power to the motor;

deactivating the controllable power driver elements for one single AC halve cycle with a repetition rate actively selected by the control pulse sequence, which results in a combination of alternating current and time spaced direct current pulses, thereby causing the motor to respond with a duration of rotating magnetic fields interspersed with a short duration standing magnetic field;

the improved step comprising:

activating the controllable back EMF suppression elements during the inactive AC halve cycle time of the controllable power driver elements, thereby feeding the EMF back into the motor, inducing a strong eddy current in the motor rotor, causing the motor to respond with a higher intensity standing magnetic field.

* * * * *